United States Patent [19]
Coetzer et al.

[11] Patent Number: 5,187,029
[45] Date of Patent: Feb. 16, 1993

[54] ELECTROCHEMICAL CELL

[75] Inventors: Johan Coetzer, Pretoria, South Africa; James H. Duncan, Stafford, England

[73] Assignee: Programme 3 Patent Holdings, Luxembourg, Luxembourg

[21] Appl. No.: 700,390

[22] Filed: May 8, 1991

[30] Foreign Application Priority Data

May 16, 1990 [GB] United Kingdom ............... 9011035

[51] Int. Cl.⁵ .............................................. H01M 6/20
[52] U.S. Cl. ................................. 429/102; 429/103; 429/162
[58] Field of Search ............... 429/162, 102, 103, 104

[56] References Cited

U.S. PATENT DOCUMENTS

| | | |
|---|---|---|
| 2,603,670 | 7/1952 | Pahler . |
| 3,980,496 | 9/1976 | Ludwig et al. ............ 429/103 |
| 4,110,517 | 8/1978 | Arntzen ............ 429/162 X |
| 4,124,740 | 11/1978 | Dubin . |
| 4,529,676 | 7/1985 | Galloway et al. . |
| 4,546,055 | 10/1985 | Coetzer et al. . |
| 4,560,627 | 12/1985 | Bones et al. . |
| 4,592,969 | 6/1986 | Coetzer et al. . |
| 4,626,483 | 12/1986 | Bones et al. . |
| 4,722,875 | 2/1988 | Wright . |
| 4,772,449 | 9/1988 | Bones et al. . |
| 4,797,332 | 1/1989 | Barrow et al. . |
| 4,797,333 | 1/1989 | Coetzer et al. . |
| 4,853,303 | 8/1989 | Steinleitner et al. ........ 429/104 |
| 4,992,345 | 2/1991 | Meintjes et al. ............ 429/103 |
| 5,051,324 | 9/1991 | Bones et al. ............ 429/104 X |

FOREIGN PATENT DOCUMENTS

| | | |
|---|---|---|
| 1558186 | 12/1979 | Fed. Rep. of Germany . |
| 57-48829 | 3/1982 | Japan . |
| 1421702 | 1/1976 | United Kingdom . |
| 1452481 | 10/1976 | United Kingdom . |
| 1465902 | 3/1977 | United Kingdom . |
| 2193837 | 2/1988 | United Kingdom . |
| 2213312A | 8/1989 | United Kingdom . |
| 2225667A | 6/1990 | United Kingdom . |
| 2340641A | 10/1990 | United Kingdom . |
| 2240424A | 7/1991 | United Kingdom . |

Primary Examiner—Stephen Kalafut
Attorney, Agent, or Firm—Arnold, White & Durkee

[57] ABSTRACT

The invention provides a high temperature rechargeable electrochemical power storage cell comprising a cell housing defining a cathode compartment containing a cathode and containing an anode structure located within the cathode compartment and comprising a plurality of holders filled with active anode material which is molten at the operating temperature of the cell. The anode structure defines a conduit containing active anode material and the holders are flattened in shape and spaced along the conduit in series from one another. The interior of each holder is in communication with the conduit and each holder has a pair of oppositely outwardly facing major faces extending transversely to the conduit and comprising a material which is a conductor of the active anode material. The cathode occupies the spaces between the holders and the cell includes a reservoir for active anode material in communication with the conduit, the reservoir in all states of charge of the cell being at least partially filled with active anode material.

34 Claims, 8 Drawing Sheets

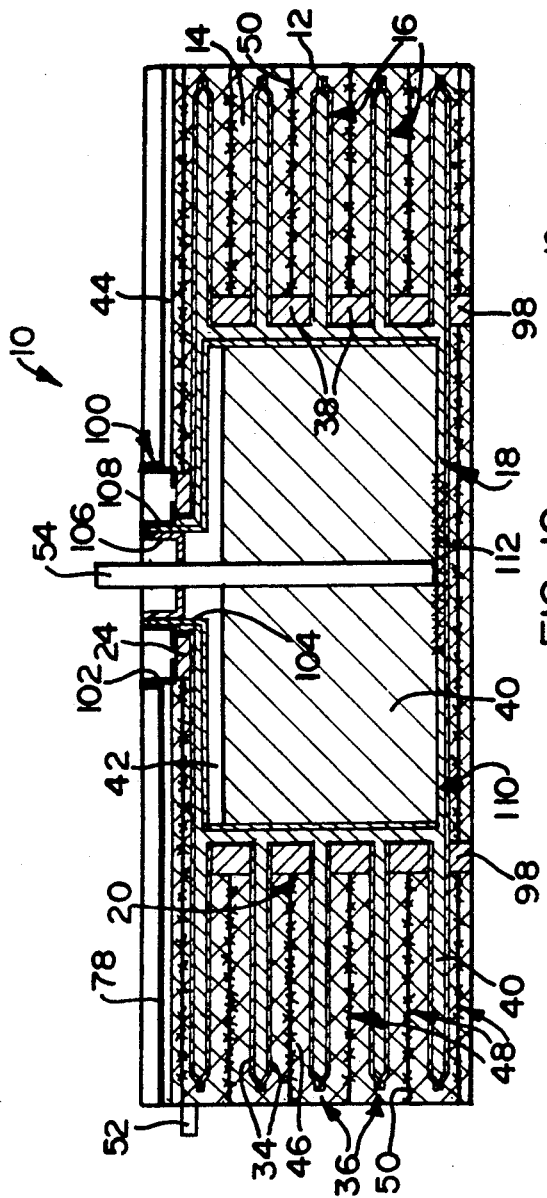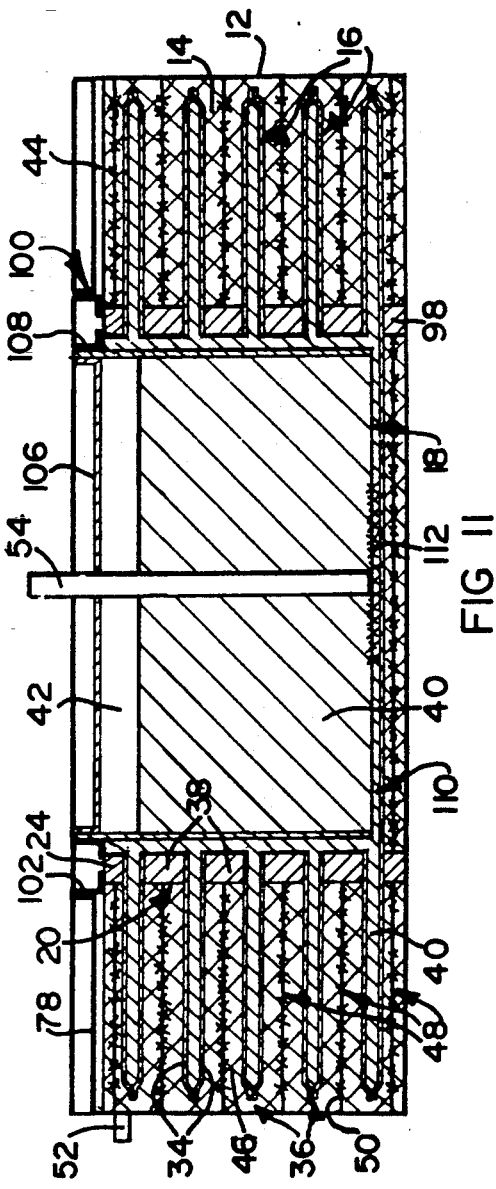

ELECTROCHEMICAL CELL

THIS INVENTION relates to an electrochemical cell. More particularly it relates to a high temperature rechargeable electrochemical power storage cell.

According to the invention there is provided a high temperature storage cell comprising a cell housing defining a cathode compartment containing a cathode and containing an anode structure located within the cathode compartment and comprising a plurality of holders filled with active anode material which is molten at the operating temperature of the cell, the anode structure defining a conduit containing active anode material and the holders being flattened in shape and spaced along the conduit in series from one another, the interior of each holder being in communication with the conduit and each holder having a pair of oppositely outwardly facing major faces extending transversely to the conduit and comprising a material which is a conductor of the active anode material, the cathode occupying the spaces between the holders and the cell including a reservoir for active anode material in communication with the conduit, the reservoir in all states of charge of the cell being at least partially filled with active anode material.

The housing may have a base forming its lower end on which it rests with the cell in an upright operative condition, the anode structure and conduit extending upwardly, eg vertically, along the interior of the housing, the holders being vertically flattened and vertically spaced in series from one another, the major faces of the holders being upper and lower faces respectively. In this case, the reservoir may be located above the conduit, being in communication with the upper end of the conduit; and the reservoir may have a floor which slopes downwardly towards a drain which leads into the upper end of the conduit.

Instead, both for this embodiment of the cell wherein the reservoir is located above the conduit, and in the embodiment described hereunder, wherein the reservoir is located in the conduit, the cell may naturally be designed to operate also in a condition in which the conduit is not upright and in which the duct or conduit can be horizontal or indeed oriented so that the end of the conduit which is in communication with the reservoir is the lower end of the conduit. Thus, the walls of the reservoir may be lined with wicking means for wicking the molten anode material, the interior of the conduit being filled with wicking material and the interior spacing between the walls of each holder which provide the major faces thereof containing particulate wicking material and/or being small enough to wick the anode material. The inner faces of said walls may, instead or in addition, have a wicking coating thereon, easily wettable by the anode material, eg of metal or carbon particles in a glass applied as a suspension in a solution of glass constituents which is applied to said walls and then dried. With the reservoir above the conduit, it is accordingly in principle possible for the cell to operate with the conduit vertical and the reservoir communicating with the lower end of the conduit, although, when possible, the cell will naturally be arranged so that gravity aids flow of anode material from the elevated reservoir into the duct conduit.

Thus, when the reservoir is located above the conduit, a construction with the conduit vertical and having the reservoir in communication with the upper end of the conduit will usually be preferred.

In another embodiment of the invention, the reservoir may be located in the interior of the conduit, being enclosed thereby. In this case, the reservoir may extend along substantially the full length of the interior of the conduit, a peripheral space being defined around the reservoir in the conduit and the holders being in communication with this space.

In this embodiment, if the cell is oriented in an attitude in which the communication between the reservoir and the conduit is at the lower end of the reservoir, then, as long as the reservoir contains molten anode material, the molten material in the reservoir can gravitate to the communication between the reservoir and the conduit and will tend to keep the space between the reservoir and inner surface of the conduit filled with molten anode material.

When the reservoir is in the conduit the housing may similarly have a base forming its lower end on which it rests with the cell in an upright operative condition, the anode structure and conduit extending upwardly along the interior of the housing, the holders being vertically flattened and vertically spaced in series from one another, the major faces of the holders being upper and lower faces respectively, the communication between the reservoir and the conduit being via the lower end of the reservoir and leading into the lower end of the conduit, and the peripheral space around the reservoir in the conduit being a capillary space. Conveniently, as indicated above, the peripheral space and reservoir extend along the full length of the conduit, from one end thereof to the other, the space being defined between the outer surface of the reservoir and the inner surface of the conduit.

With the reservoir inside the conduit it is also in principle possible for the cell to operate with the cell oriented in attitudes other than its upright condition, although, when possible, the cell will naturally be arranged so that gravity aids flow of anode material from the reservoir into the conduit. Thus, in this case, a construction with the conduit vertical and having the reservoir in communication with the lower end of the conduit will usually be preferred.

When the communication between the reservoir and the conduit is via the lower end of the reservoir, the reservoir may contain, above the molten anode material therein, an inert gas under pressure, and, in general, the reservoir, holders and conduit may have an internal lining of wicking material for wicking, as indicated above, molten anode material. The conduit may be provided by the interior of a hollow tube on which the holders are mounted in spaced relationship in series, the tube communicating with the interiors of the holders via central openings in the major faces of the holders; and the tube may be made up of a plurality of annular segments arranged end-to-end, so that the tube is of composite construction, the segments spacing the holders apart and being sealed thereto.

The upwardly extending conduit may thus be provided by the interior of a tube in the form of an upwardly extending hollow tubular pillar on which the holders are mounted to be vertically spaced in series from one another, the interior of each holder communicating with the interior of the pillar and thence with the reservoir.

The housing may be in the form of a metal can and may have a plan view outline, corresponding with the plan view outlines of the holders, which permits close packing of a plurality of like cells in side-by-side fashion. Thus, the plan view outline of the housing and holders may be rectangular or preferably square, hexagonal or equilateraltriangular, although other outlines such as circular outlines can be used.

Each holder may be in the form of a vertically flattened, i.e. vertically compressed, envelope, the pillar with its conduit being centrally located relative to the major faces of the envelopes.

In one embodiment the pillar may be in the form of a unitary ceramic tube, which may be ionically conducting and of the same material as the solid electrolyte of the envelopes, but is preferably an ionically and electronically insulating material. In this case each envelope may have an opening in each of its major faces through which the pillar passes, the envelopes each being sealed, eg by glass welding, to the outer surface of the pillar at the periphery of their said openings and the pillar having passages through its wall, one or more of which passages lead into each said envelope. In this case the anode structure may include a plurality of annular spacers, again optionally of the same ionically conducting material as the solid electrolyte of the envelopes but preferably of an ionically and electronically insulating material, whereby the envelopes are spaced vertically from one another in series, the spacers being sealed to the pillar, eg by glass welding.

In another case the pillar may in fact be constituted by the spacers themselves, the spacers forming the annular segments referred to above and being sealed, again eg by glass welding, to the envelopes with internal passages in the spacers in register with and in communication with openings in the envelopes.

In each case at least the opposite ends of the pillar are conveniently both electronically and ionically insulating, the lower end of the pillar resting on the floor of the housing and the upper end of the pillar being sealed to the housing at the periphery of an opening in the roof of the housing.

When the reservoir is above the pillar, the interior of the pillar will communicate with the reservoir via the opening in the roof of the housing, the reservoir also being sealed to the upper end of the pillar and being electronically insulated from the housing.

When the reservoir is located in the interior of the pillar, the opening in the roof of the housing may be closed, e.g. by a metal closure panel which is electronically insulated from the housing. In this case the reservoir may be cup shaped, being inverted in the upright condition of the cell, so that the cup has a floor which is uppermost and a rim which opens and faces downwardly.

As mentioned above, the cathode of the cell occupies the spaces between the envelopes and indeed conveniently surrounds and encloses each envelope so that the envelopes are embedded or immersed therein. As the anode material is contained in a reservoir, the cell capacity will usually be cathode-limited although the amount of anode material in the reservoir can in principle be matched with the amount or capacity of the cathode material and, if the edges of the envelopes are closely spaced from the cell housing, the amount of cathode material and cell capacity will essentially correspond with the total volume occupied by cathode material in the spaces between the envelopes, while cell power will depend on the separator area provided by the major faces of the envelopes of the anode structure, a large number of closely spaced envelopes being employed for high power applications.

Conveniently, the total amount of anode material will be matched with cathode capacity so that there is a slight excess of anode material; and whether a large reservoir is used with envelopes of small internal volume or vice versa, is a matter of design choice and selection.

It will be appreciated that the cell construction described above leads to considerable freedom of cell design while retaining considerable potential for mass production. For a standardized housing outline in plan view, and for a standardized envelope design, cell capacity is altered simply by varying the overall height of the cell and the number of envelopes used. The rate of charge/discharge or power characteristics of the cell in turn can be altered simply by varying, within limits, the spacing between the envelopes. This can be an important advantage of such cells.

In a further construction of the anode structure, each holder may be formed from a pair of spaced panels respectively providing the major faces of the holder, the panels of each said pair being sealed together along their outer peripheries, and each adjacent pair of holders being connected together face to face in communication with each other at openings in opposed major faces thereof, along the peripheries of which openings said major faces are sealed to each other. In this case two annular discs of green, plastic unsintered tape material can be pressed together at their outer edges to form a holder or envelope, each of said discs being pressed along the periphery of its inner edge to the periphery of the inner edge of an opposed disc on an adjacent holder or envelope, after which the anode structure is sintered. The aligned central openings of the holders will form a conduit, and if desired, the reservoir can be provided in this conduit defined by the central openings of the discs; or the reservoir can be provided above the conduit, as described above. In this case there need be no separate tube or pillar providing the conduit.

Instead, the anode structure may be of unitary construction, being a casting, each adjacent pair of holders communicating with each other via openings in the major faces thereof and being connected together along the peripheries of said openings. In this case the anode structure can eg be slip-cast in an appropriately shaped mould, before sintering; or it can be dip-cast by immersing eg a paper shape or former in a slurry, the paper subsequently being burnt off during sintering.

While the anode material may in principle be any electronically conductive material which can be conducted by the material of the major faces of the envelopes, it will typically be an alkali metal, usually sodium, whose anions can be conducted by a solid electrolyte separator material. A number of suitable conductors of sodium ions are well known, for example nasicon (ie $Na_3Zr_2PSi_2O_{12}$), certain sodium ion-conductive glasses eg as described in Japanese Laid Open Patent Application No. 62-274566 and, particularly, $\beta$- or $\beta''$-alumina, which conductors can be used alone or in mixtures, in sintered form, for the holders. With an alkali metal anode, the reservoir can be made of nickel, iron, steel or the like, and can act as the anode terminal.

Accordingly, the anode material is typically sodium, the major faces of the holders being solid electrolyte conductors of sodium ions.

As regards the cathode, while it can in principle be, for example, sulphur/sodium sulphide/polysulphide as in a sodium/sulphur cell, it preferably comprises an electronically conductive electrolyte-permeable porous matrix which is impregnated with a molten salt electrolyte comprising sodium cations (ie cations of the alkali metal of the anode) and halide anions, an electrochemically active metal halide cathode substance being dispersed in the porous interior of the matrix and the active cathode substance being substantially insoluble in the electrolyte.

The matrix will thus occupy the spaces between the envelopes and in each said space there may be a current collector in the form of a metal grid, mesh or gauze, conveniently connected electronically at its periphery to the housing at one or more spaced positions, the housing in turn being of similar metal (as will emerge hereunder) and acting as the cell cathode terminal.

Suitable cathodes for cells of the present invention, comprising an electronically conductive matrix having an electrochemically active cathode substance dispersed therein and impregnated with liquid electrolyte, suitable for the cell of the present invention, and methods of making them, are described eg in U.S. Pat. Nos. 4,546,055, 4,529,676, 4,560,627, 4,592,969, 4,626,483, 4,722,875, 4,772,449, 4,797,332 and 4,797,333, and British published patent application 2 193 837. These prior art references also describe suitable solid electrolytes and molten alkali metal anodes, principally $\beta$- or $\beta''$-alumina electrolytes for the envelopes and sodium anodes.

In particular the cathode matrix may be a transition metal such as a porous iron, nickel, chromium, cobalt or manganese, the active cathode substance correspondingly being $FeCl_2$, $NiCl_2$, $CrC_2$, $CoCl_2$ or $MnCl_2$. Of these, $Fe/FeCl_2$ and $Ni/NiCl_2$ cells are usually preferred, because of availability and cost, and in these cells, correspondingly, the housing and current collectors will typically be iron or steel when the cathode is $Fe/FeCl_2$ and nickel when the cathode is $Ni/NiCl_2$.

As the liquid electrolyte, an electrolyte of the type $MAlHal_4$, in which M is the alkali metal of the anode and Hal is a halogen will usually be used, eg $NaAlCl_4$. In these electrolytes the molar proportions of Al ions should not exceed the molar proportion of alkali metal ions, ie the molar ratio of Al:M should not be greater than 1:1. This can be achieved by ensuring that the cathode compartment contains a proportion of solid alkali metal halide (MHal) in contact with the liquid electrolyte during all states of charge of the cell.

With regard to electrolytes of the $MAlHal_4$ type, such as $NaAlCl_4$, in which the Al:M molar ratio is not more than 1:1, it is a particular advantage that, in addition to providing for substantial insolubility therein of active cathode substances such as $FeCl_2$, $NiCl_2$, $CrCl_2$, $CoCl_2$ or $MnCl_2$ when the Al:M ratio is about 1:1, such electrolytes also exhibit their minimum vapour pressure when said ratio is about 1:1, at the cell operating temperatures typically encountered. This is important from a constructional and safety point of view, as thin-walled envelopes of eg $\beta''$-alumina can be brittle and prone to damage by high electrolyte vapour pressures, particularly during temperature excursions caused eg by cell malfunctions.

In the various patents and patent applications mentioned above, various options are described regarding the microstructure and electrochemical properties of the various features of the cells of the present invention. Thus U.S. Pat. No. 4,546,055 describes the basic cell from which the present invention is derived; U.S. Pat. No. 4,529,676 describes a method of making suitable cathodes for the cell of the present invention from a transition metal-containing matrix and the alkali metal halide discharge reaction product of the cathode, and it describes the possibility of using one or more intermediate refractory hard metal compounds of fe, Ni, Co, Cr and Mn with at least one non-metal selected from the group comprising carbon, silicon, boron, nitrogen and phosphorous as the active cathode substance in its discharged state, the refractory hard metal compound being during charging by chlorination; U.S. Pat. No. 4,560,627 describes the use of $Co/CoCl_2$ or $Ni/NiCl_2$ as a cathode substance in parallel with a $Fe/FeCl_2$ cathode to protect the $Fe/FeCl_2$ cathode from overcharging; U.S. Pat. No. 4,592,969 describes the use of fluoride anions as a dopant in an $NaAlCl_4$ electrolyte to resist progressive internal resistance rise of the cell with sustained cycling believed to arise from poisoning of a beta-alumina separator by $AlCl_3$ in the electrolyte; U.S. Pat. No. 4,626,483 describes the use of chalcogens such as S or Se as dopants in the liquid electrolyte and/or active cathode substance to resist progressive reduction in cathode capacity with sustained cycling, for $Ni/NiCl_2$ cathodes; U.S. Pat. No. 4,722,875 describes a method of making cathodes for cells according to the present invention from discharge reaction products of the cathode in particulate form with electrolyte; U.S. Pat. No. 4,772,449 describes a method of making a cathode suitable for the cells of the present invention by making a transition metal (Fe, Ni, Cr, Co or Mn) cathode matrix with sodium chloride dispersed therein by oxidizing the metal in particulate form followed by reduction thereof; U.S. Pat. No. 4,797,333 describes a method of making cathodes suitable for cells of the present invention by charging a cathode precursor comprising alkali metal aluminium halide molten salt electrolyte, alkali metal halide, aluminium and transition metal (Fe, Ni , Cr, Co or Mn); published British Patent Application 2193837A describes using magnesium dissolved in a sodium anode suitable for the cell of the present invention, when used with a beta-alumina separator, the magnesium acting as a getter for dissolved impurities in the sodium which can accumulate at the sodium/separator interface; and U.S. Pat. No. 4,797,332 describes doping the surface exposed to the alkali metal of the anode of a ceramic solid-electrolyte separator with a transition metal oxide to improve the wettability of the separator surface by molten anode alkali metal.

It will accordingly be appreciated that, as far as the microstructure and electrochemical properties of the various features (anodes, separators, cathodes, etc) of the cells of the present invention are concerned, and methods of making them, a large number of combinations and possibilities are available, as described, for example, in the abovementioned prior patents and patent applications; and combinations of these various options may be employed, where desirable and compatible.

To make the envelopes a mouldable mixture comprising the solid electrolyte or a precursor thereof may be formulated in particulate form together with one or more binders having both thermoplastic and thermosetting properties. This mixture can then be formed into sheet material, from which sheet material can be formed a laterally flattened envelope having a pair of major faces comprising said sheet material, the major faces being joined to each other along a peripheral edge of the envelope. The envelope can then be treated to cure the setting binder, followed by heating the cured envelope to volatilize the binder or binders, followed in turn by sintering the envelope after the binder or binders have been volatilized, to convert the envelope into a sintered refractory artifact.

Suitable thermoplastic and thermosetting binders are known for the purpose of the present invention from British patent 1 274 211, from which it emerges that, instead of employing separate binders respectively with thermoplastic and thermosetting properties, a single binder may be used provided that it displays both the required thermoplastic and thermosetting properties.

Thus, polyvinyl-butyral may be used together with dibutyl phthalate as a plasticizer and a solvent such as methyl ethyl ketone, as both a thermoplastic and thermosetting binder, the solvent and plasticizer facilitating blending of the binder into eg $\beta''$-alumina powder to form a homogeneous mixture. Instead a high energy mixer can be employed, such as a Banbury mixer, in which case the solvent can be omitted.

Forming the mixture into sheet material may also be described in British patent 1 274 211, eg by calendering, rolling or by a doctor blade technique. The sheet material may also be densified as described in British patent 1 274 211, eg by roll compacting or pressing.

Forming the sheet material into the laterally flattened envelopes will typically be by arranging two sheets of the material of the same size and shape (eg square) face-to-face in register with each other, and pinching their edges together with sufficient force plastically to deform them into each other, to form an integral join along said periphery along the sheets. The pinching may be with the sheet at an elevated temperature in the range of 50°–150° C., eg 60° C., at which temperature the binder exhibits a degree of thermoplastic softening. Instead, or in addition, particularly when the pinching takes place towards the lower end of said temperature range, the method may include applying said solvent to the edges, between them where they are pinched together, prior to the pinching, to permit the use of a reduced pinching force. Indeed, if desired, such solvent can be used with pinching to seal the edges together at room temperature.

Suitable methods for making the mixture, forming it into an envelope and heating and firing it are described in more detail in the Applicant's co-pending British Published Patent Application 2 231 567A.

In accordance with a particular feature of the present invention, it is preferred to provide the inner faces of the two sheets with a plurality of parallel ribs or corrugations eg by rolling them between smooth and corrugated rollers. Radially extending channels may then be provided in the corrugated faces of these rollers, eg by pressing, and a central opening can be punched from each sheet. The sheets are then placed face-to-face, with their central openings and channels, which channels conveniently extend diagonally, in register, but, importantly, with the corrugations of one of the sheets extending normally to, or at least at an angle to, the corrugations of the other of the sheets. The sheets are then sealed together along their peripheries as described above, and the envelopes sintered.

In this construction, each of the valleys or grooves of the corrugations intersects at least one of the channels, and the ridges of crests of the corrugations of one sheet can abut the ridges or crests of the corrugations of the other sheet, thereby giving the envelope considerable compressive strength in a direction normal to its major faces, while ensuring that substantially the whole of its inner surface can be wetted by molten sodium or like anode material contained in its interior. In this construction relatively thin envelopes are possible, containing relatively little molten sodium, the interior of the envelope comprising an interconnected network of grooves and channels which provides reliable communication thereof with the central opening of the envelope and hence with the interior of the pillar and thence with the reservoir.

Conveniently the dimensions of the corrugations and channels are sufficiently small so that molten anode material can be wicked therealong by capillary action, reliably to fill and wet the whole of the interior of each envelope. To aid in this wicking said corrugations and channels can be painted or otherwise wetted with a suspension of easily wettable particles, such as carbon or metal particles which are inert in the anode environment, in a solution of glass constituents, the suspension after drying and heating forming a coating which is easily wetted by and wicks the anode material over the painted surface, without interfering with ion migration through the walls of the envelope. Indeed, a particulate wicking material can, if desired, be provided in the interior of the envelope, between the sheets, in the channels and grooves. This wicking material, if it is resistant to wetting, and indeed any other wicking material used in the cell to wick anode material, can be treated as described in U.S. Pat. No. 4,797,332 to have a transition metal oxide surface for enhanced wettability.

As indicated above, the possibility exists for making cells of the type in question by loading the cell cathode compartment with a cathode precursor comprising alkali metal molten salt electrolyte, alkali metal halide, aluminium and a transition metal, to act as a cathode precursor. If this preferred method is used, the cell can be loaded with the anode holders or envelopes and reservoir empty of alkali metal anode material, the anode material being introduced into the envelopes and reservoir by commissioning the cell by applying charging potential to the cell (or cell precursor as it can be regarded after loading).

For this to be achieved, the interior surfaces of the envelopes are preferably rendered electronically conductive, eg by lining them with graphite by rinsing their interiors with a suitable (10% by mass) suspension of colloidal graphite in water or ethanol, such as Aquadag supplied by Acheson Colloids Co, Prince Rock, Plymouth, followed by drying to leave an electronically conductive graphite lining on the interior surface of the envelope. Instead, a conductive metal lining can be provided, which is compatible with (eg inert to) the interior environment of the envelope, such as copper or lead, eg by providing a lead lining by rinsing with a solution of lead acetate. After drying, the lead acetate lining left by said rinsing on the interior surface of the envelope will be reduced by alkali metal anode material to lead. Indeed the abovementioned painting with a glass-forming layer containing carbon or metal particles can also contribute to such conductivity.

To permit current to flow at the start of commissioning by means of a charging potential, the anode terminal, which will usually be on or connected to the reservoir, should be placed in electronic contact with a conducting interior surface of at least one of the envelopes, preferably the envelope furthest from the reservoir, eg by means of a metal rod or wire extending from said interior surface to the reservoir.

The invention will now be described, by way of example, with reference to the accompanying schematic drawings, in which:

FIG. 10 shows a vertical cross-section through another electrochemical cell in accordance with the present invention;

FIG. 11 shows a cross-section similar to FIG. 10 of yet another electrochemical cell in accordance with the present invention;

Figure 1:
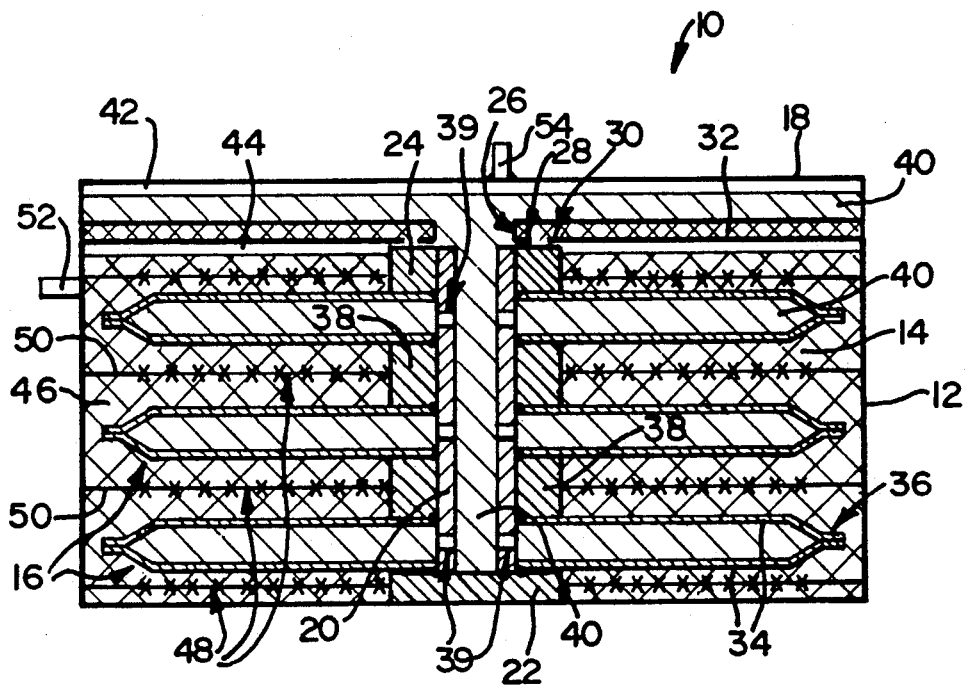
FIG. 1 shows a vertical cross-section through an electrochemical cell in accordance with the present invention.

Referring first to FIG. 1, an electrochemical cell in accordance with the present cell is generally designated by reference numeral 10. The cell 10 comprises a housing 12 in the form of a mild steel can which is square in plan view outline. The housing 12 defines a cathode compartment, within which is provided a cathode 14, described in more detail hereunder.

In the housing 12, embedded in the cathode 14, is provided an anode structure. The anode structure comprises a central pillar on which are mounted a plurality of vertically flattened $\beta''$-alumina envelopes 16, in vertically spaced relationship. On top of the can 12, and having substantially the same plan view outline, is provided a mild steel reservoir 18.

Said pillar for the anode structure of FIG. 1 is provided by a vertically extending $\alpha$-alumina tube 20. The tube 20 is supported at its lower end by an $\alpha$-alumina (or $\beta$- or $\beta''$-alumina) disc 22, and has its upper end encircled by an $\alpha$-alumina collar 24. The disc 22 and collar 24 are sealingly welded by means of glass to the tube 20.

The roof of the can 12 has a circular central opening therethrough, as does the floor of the reservoir 18, the opening in the floor of the reservoir 18 being provided with a downwardly projecting neck 26 having a radially outwardly projecting circumferential flange at its lower end which is thermocompression bonded at 28 to the upper surface of the collar 24, which is typically metallized to improve this thermocompression bonding and sealing at the bond. The periphery of the opening in the roof of the can 12 is thermocompression bonded at 30 to said upper surface of the collar 24 in a similar fashion, so that the periphery of the opening in the roof of the can 12 is spaced radially outwardly from and electronically insulated from said flange of the neck 26 of the reservoir 18. The upper surface of the collar 24 has an annular zone which is unmetallized, between the thermocompression bonding at 28 and at 30. A mica insulating pad 32 is provided between the floor of the reservoir 18 and the roof of the can 12, having a central opening through which the neck 26 of the reservoir 18 passes.

Each of the envelopes 16 is formed from a pair of square sheets 34 of $\beta''$-alumina sealed together at their peripheries as at 36. Each of the envelopes 16 has a central opening therethrough, formed by central openings through the sheets 34, and through which the pillar 20 passes. The lowermost envelope 16 rests on the disc 22, and between each adjacent pair of envelopes 16 is provided an annular $\alpha$-alumina (or $\beta$- or $\beta''$-alumina) spacer 38.

The periphery of the central opening through each of the sheets 34 of each envelope 16 is sealed by glass welding to the outer cylindrical surface of the pillar 20, said sealing simultaneously joining said pillar and sheets 34 to the adjacent spacers 38, where the respective sheets 34 and spacers 38 abut at the outer curved surface of the pillar 20.

The pillar 20 has, through its wall, and in register with the interior of each envelope 16, a plurality of radial passages 39, whereby the interior of the pillar 20 and hence the interior of the reservoir 18, are placed in communication with the interior of each envelope 16.

The collar 24 is sealed to the pillar 20 and the envelope 16 below it, and the disc 22 is sealed to the pillar 20 and the envelope 16 above it, in the same fashion as the sealing described above with respect to the spacers 38.

Each of the envelopes 16, and the interior of the pillar 20, are filled with sodium which is molten at the operating temperature of the cell, the reservoir 18 in turn being partially filled with said sodium, which is designated 40, a gas space 42 being provided in the reservoir 18 above the sodium 40, and containing an inert gas such as argon, or nitrogen. Instead, oxygen may initially be charged into this space, the oxygen subsequently reacting with the sodium and being replaced by sodium vapour which can be at a sub-atmospheric pressure.

The can 12 in turn has a gas space 44, containing an inert gas such as argon, below its roof, and is otherwise filled, in its interior outside the anode structure by a cathode matrix 46, typically of porous iron, whose porous interior is saturated with a molten metal halide salt electrolyte, molten at the operating temperature of the cell, and comprising an essentially equimolar mixture of NaCl and AlCl$_3$, so that it has the approximate formula NaAlCl$_4$.

In fact, the porous interior of the matrix has a small amount of solid NaCl in finely divided particulate form evenly dispersed therein, to ensure that the NaCl:AlCl$_3$ molar ratio in the electrolyte is at all times, and particularly when the cell is fully charged, slightly greater than 1:1.

The cathode matrix 46 contains, as its active cathode material in the charged state of the cell, a metal halide namely NiCl$_2$, in finely divided or thin layer form, dispersed throughout the porous interior thereof.

Embedded in the matrix 46 are a plurality of steel mesh current collectors 48. These current collectors are joined at spaced positions along their outer peripheries to the can 12 by steel wires 50, which electronically connect said current collectors 48 with the can 12 which forms the cathode terminal and is provided with a cathode terminal post 52, the reservoir 18 similarly acting as the anode terminal and being provided with an anode terminal post 54.

Figure 1A:
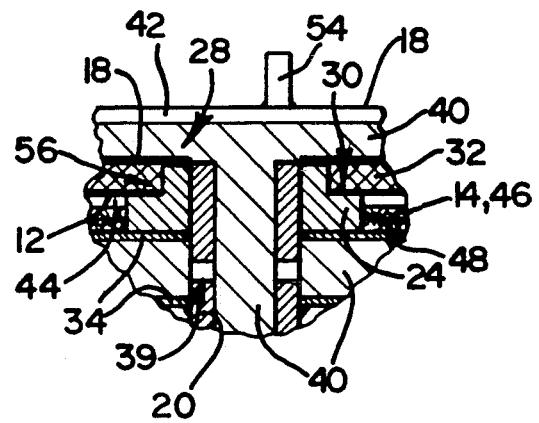
FIG. 1A shows a detail of a variation of the cell of FIG. 1.

In FIG. 1A a slight variation of the construction of FIG. 1 is shown in detail, whereby the collar 24 has, at its upper surface and outer curved periphery, a rebate 56. The reservoir 18 is again thermocompression bonded at the same position to the upper surface of the collar 24, but the can 12 is thermocompression bonded to the upwardly facing surface or step provided by the rebate 56, at 30, so that the thermocompression bonded parts of the reservoir 18 and can 12 are vertically spaced from each other and electronically insulated from each other, by the vertical cylindrical surface provided by the rebate 56.

Figure 2:
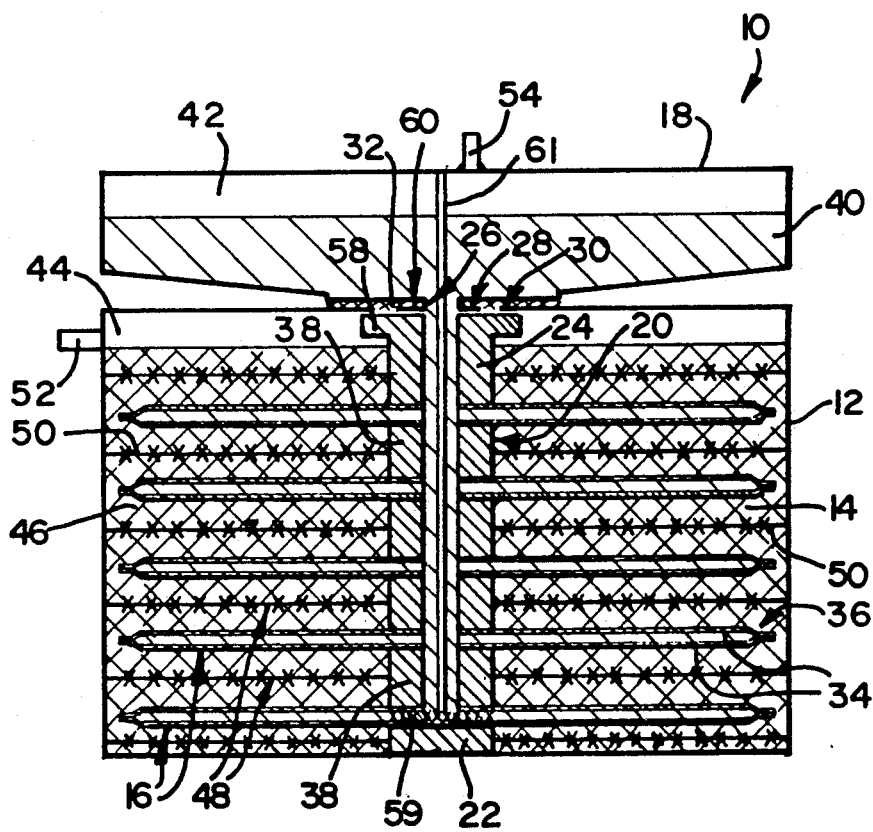
FIG. 2 shows a cross-section similar to FIG. 1 of another electrochemical cell in accordance with the present invention.

Turning to FIG. 2, the same reference numerals are used for the same parts as in FIG. 1, unless otherwise specified, the cathode terminal post 52, as described above with reference to FIG. 1, being connected to the can 12, which forms the cathode terminal.

The main difference between FIG. 2 and FIG. 1 is that the pillar constituted by the monolithic or unitary α-alumina tube 20 of FIG. 1 is omitted from FIG. 2. Instead, the annular spacers 38 (with the disc 22 and collar 24) combine as annular or circular (the disc 22) segments to provide the pillar 20 with composite construction, the central openings of the spacers and collar registering with the openings through the sheets 34 of the envelopes 16, to provide the hollow interior of the pillar 20, which communicates directly with the interiors of the envelopes 16. The collar 24 provides the upper end of the pillar, and the disc 22, spacers 38 and collar 24 are sealed with glass to the envelopes 16, to isolate the sodium 40 of the anode from the cathode 14. Another difference is that the collar 24 has a radially outwardly projecting circumferential flange 58 at its upper end, to provide an increased surface area for the thermocompression bonding at 28 and 30; and the reservoir 18 has a floor with a flat lowermost central portion 60, from which the remainder of the floor slopes upwardly towards its periphery, so that the floor drains downwardly to the top of the pillar, the mica insulation 32 being provided only below said portion 60.

In FIG. 2 there is also shown a pad of steel wool 59 centrally located in the lowermost envelope 16, in contact with the inner surfaces of its sheets 34. A steel rod 61 extends down the interior of the pillar from an upper end which is fast with the roof of the reservoir 18, to a lower end in contact with the steel wool 59. The steel wool and rod are used at commissioning of the cell, as described hereunder, to place the terminal post 54 in contact with the inner surface of the lowest envelope, which inner surface is conducting, having a layer of electronically conductive graphite thereon. A similar arrangement of wool 59, rod 61 and conductive inner surface will be provided also in the cell of FIGS. 1 and 1A, although not shown there.

Naturally, the various discs, spacers or collars such as at 22, 24, 38 etc need not be solid, but can be profiled in cross-section to reduce their mass.

Figure 2A:
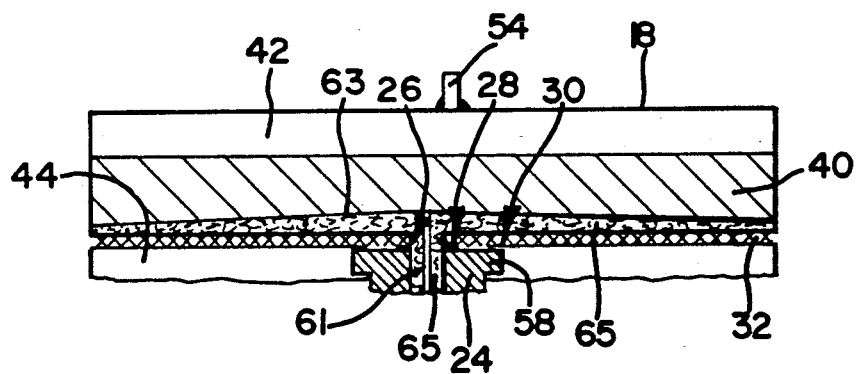
FIG. 2A shows a detail of a variation of the cell of FIG. 2.

In FIG. 2A again, unless otherwise specified, the same reference numerals refer to the same parts as in FIG. 2. In this case the reservoir has a flat floor on which is provided a foreshortened pyramidal steel plate 63 having a central apex to which the rod 61 is connected, the edges of the plate 63 being located, eg by being tack-welded at spaced positions, in the corners between the side walls and floor of the reservoir 18. The space between the plate 63 and the floor of the reservoir 18, and the interior of the pillar are filled with wicking material 65, in which the rod 61 is embedded. This construction permits sodium 40 from the reservoir to be wicked into the interior of the pillar and hence into the envelopes 16 during discharging of the cell when the cell is not upright and when reduced, or indeed no assistance, is provided by gravity in feeding sodium from the reservoir 18 to the envelope 16.

Figure 3C:
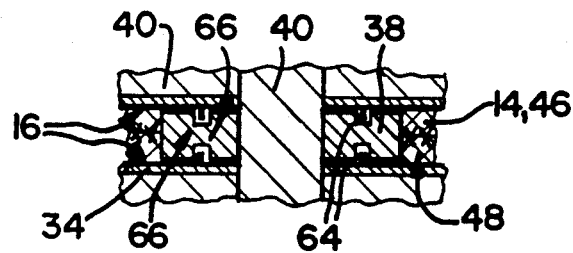
FIGS. 3A–3C show details of the construction of the cells of FIGS. 1 and 2.
Figure 3A:
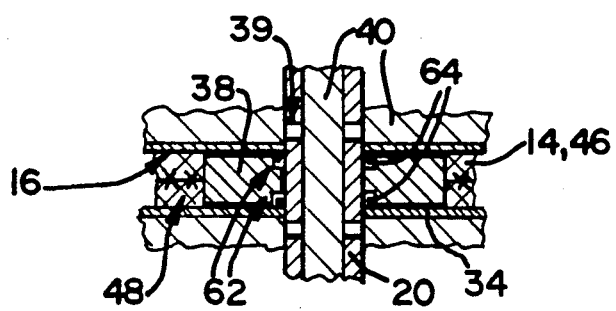
Figure 3B:
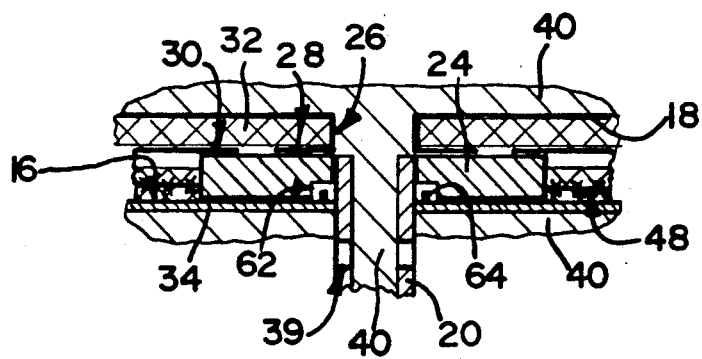

Turning to FIGS. 3A and 3B, further details of possible constructions of the cell of FIG. 1 are shown. Once again, unless otherwise specified, the same reference numerals are used for the same parts as in FIG. 1. FIG. 3A shows that the spacers 38 each have, in their upper and lower surfaces and at their inner periphery, a pair of annular rebates 62. In making the anode structure, annular glass rings 64 are provided in these rebates 62, after which the spacers 38 are located axially in position on the tube 20, followed by sufficient heating to melt the glass rings 64, to provide the glass seals which, in the corners between the spacers 38, sheets 34 of the envelopes 16 and tube 20, provide the glass seal which seals off the cathode 14 from the sodium 40 of the anode in the tube 20 and envelopes 16.

Turning to FIG. 3B, the same reference numerals are again used for the same parts as in FIG. 1, and the detail shows that the collar 24 has a similar rebate 62 in its lower surface containing a glass ring 64 whereby it is sealed simultaneously to the tube 20 and to the upper sheet 34 of the uppermost envelope 16.

In FIG. 3C a detail is shown of the construction of FIG. 2, the same reference numerals being used for the same parts as in FIG. 2 unless otherwise specified. In this case, the spacers 38 are shown with annular grooves 66 provided respectively at central positions in a radial direction in their upper and lower surfaces, each annular groove containing a glass ring 64 which seals, in similar fashion to that described above with reference to FIGS. 3A and 3B, the spacers 38 to the adjacent sheets 34 of the envelopes 16, thereby again sealing off the sodium 40 from the cathode 14.

Although not shown in detail, the disc 22 can be sealed in similar fashion to the tube 20 and/or lowermost envelope 16.

Figure 4:
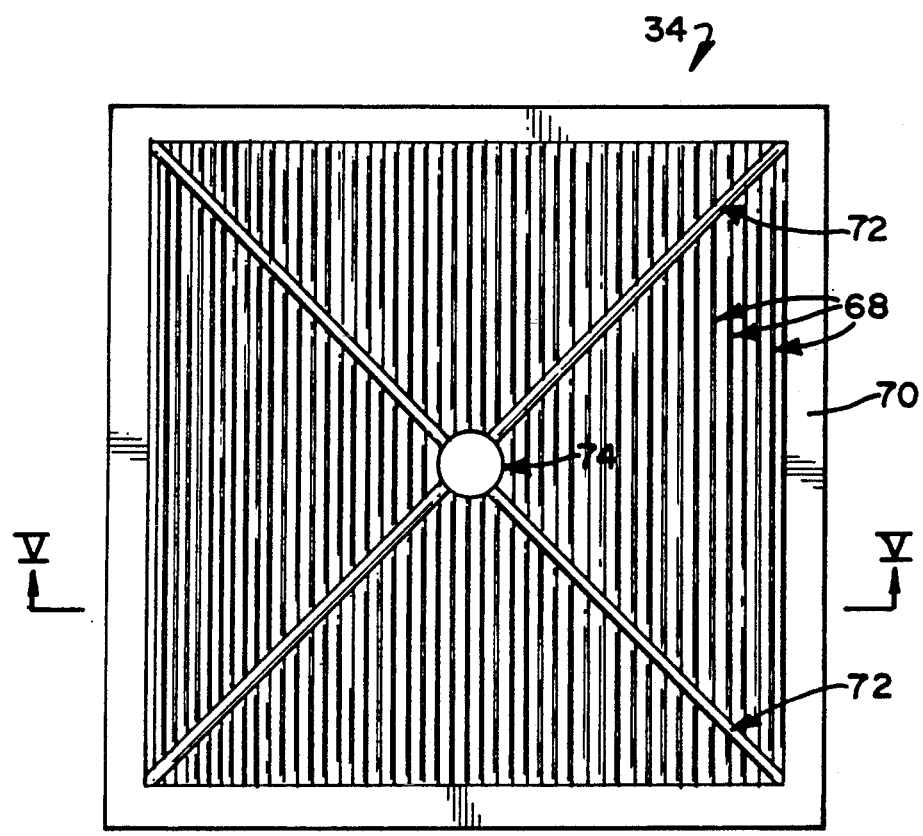
FIG. 4 shows a face-on view of a sheet of mouldable mixture from which the envelopes of the cell of FIG. 2 are made.
Figure 5:
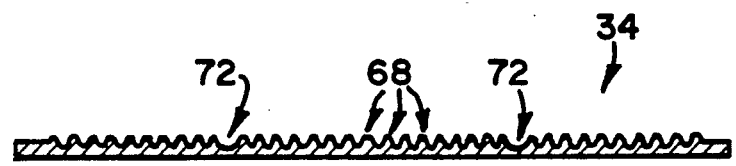
FIG. 5 shows a section in the direction of line V—V in FIG. 4.

Turning to FIGS. 4 and 5, one of the sheets 34 making up the envelopes 16 of FIG. 2 is shown respectively face-on and in sectional side elevation, in a mouldable plastic state, before formation of said envelope 16. The sheet 34 is made typically of powdered β"-alumina mixed together with a polyvinyl-butyral thermoplastic/thermosetting binder, together with dibutyl phthalate plasticizer and methyl ethyl ketone solvent to provide a mouldable mixture. This mixture is rolled into a square flat sheet, between a flat roller and a corrugated roller, to provide one side of the sheet 34 with corrugations 68. The sheet is then pressed to provide it with an uncorrugated flat periphery 70 and a pair of channels 72 extending along its diagonals, each extending from the periphery 70 at one a corner of the sheet, to the opposite corner. A central opening 74 is punched in the sheet. The arrangement is such that each of the grooves or valleys defined by the corrugations 68 intersects at least one of the channels 72, except at the centre of the sheet 34, where said channels 72 are interrupted by the opening 74, and where the grooves or valleys, instead, intersect said opening 74.

To make the envelopes 16 of FIG. 2, a pair of the sheets 34 are placed face-to-face, with their corrugated faces abutting, but with the corrugations 68 of one sheet running normally to the corrugations of the other sheet, so that they abut at points on their crests. The peripheries 70 of the sheets 34 are sealed together with the sheets 34 in their plastic state, by coating them with methyl ethyl ketone solvent which acts as an adhesive, and pressing them together with a suitable pressure while heating them to a suitable temperature, eg 60° C., at which the polyvinylbutyral is plastic. This pressing is so as to bond and seal said peripheries 70 of the two sheets 34 integrally together.

The green envelope so formed is then heated, initially to cure the polyvinyl-butyral/dibutyl phthalate mixture and set it, then to volatilize the binder, plasticizer and solvent, and finally to sinter the envelope into a unitary ceramic $\beta''$-alumina envelope, having a central opening provided by the openings 74, and an interior provided by the channels 72 and the grooves or valleys defined by the corrugations 68.

The crests of the corrugations 68 of the two sheets will in fact typically abut one another, so that it will be appreciated that the spacing between the sheets 34 shown in FIG. 2 is exaggerated for ease of illustration. The interior of the envelope 16 so formed is accordingly relatively small in volume, but the entire interior surface of the envelope, except the points where the corrugations of the one sheet cross over and abut the corrugations of the other sheet, is available to be filled with molten sodium, which molten sodium is reliably and fully in communication via the channels 72 with the central opening 74, which central openings in FIG. 2 combine with the interiors of the spacers 38 to form the hollow interior of the pillar.

In use, upon application of a charging potential to the terminals posts 52, 54, cell charging takes place in accordance with the reaction:

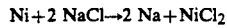

$$Ni + 2 NaCl \rightarrow 2 Na + NiCl_2$$

This reaction takes place in the cathode 14, sodium ions passing via the $NaAlCl_4$ molten salt electrolyte and through the solid electrolyte constituted by the sheets 34 of the envelopes, into the interiors of the envelopes. The level of the sodium 40 in the reservoir 18 accordingly rises, decreasing the volume of the space 42, while the level of the electrolyte in the can 12 drops, increasing the volume of the space 44.

During discharging, the above reaction is reversed and the level of the electrolyte rises in the can 12, decreasing the volume of the space 44, while the level of the sodium 40 in the reservoir drops, increasing the volume of the space 42.

Cells in accordance with the invention can be made in a straightforward fashion, as described hereunder with reference to FIGS. 6-9, in connection with which the construction of a cell similar to that of FIG. 2 will be described. In FIGS. 6-9, unless otherwise specified, the same reference numerals are used as in FIG. 2.

Figure 6:
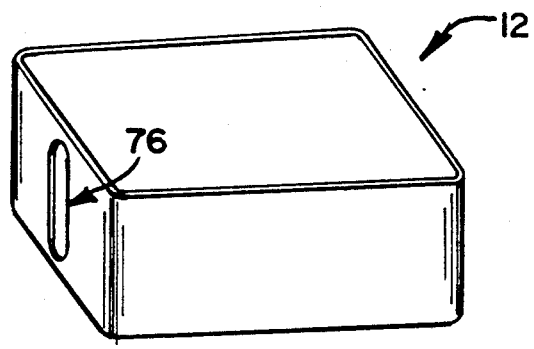
FIG. 6 shows a three-dimensional view of an open-topped housing for a cell according to FIGS. 1 and 1A.

FIG. 6 shows the housing 12 for the cell, which is an open-topped deep drawn mild steel can of substantially rectangular shape, being substantially square in plan view and having rounded corners. One side wall of the can is provided with a slot 76 for use during loading of the cell as described hereunder.

Figure 7:
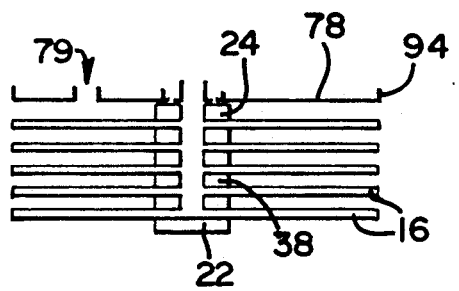
FIG. 7 shows a schematic sectional side elevation of an anode structure for a cell according to the invention, for use with the housing of FIG. 6.
Figure 7A:
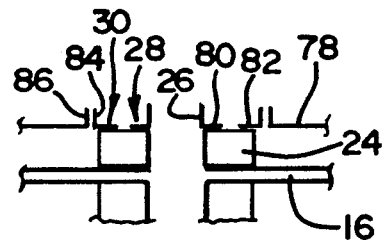
FIG. 7A shows a detail on an enlarged scale of the structure of FIG. 7.

Turning to FIGS. 7 and 7A the anode structure is shown attached to a roof or lid 78 for the can 12. The lid 78 has a filler opening 79 and an upstanding peripheral flange 94. With particular reference to FIG. 7A, the collar 24 is shown having two metal rings 80 and 82 concentrically thermocompression bonded thereto at 28 and 30. The radially inner ring 80 has an upstanding annular flange which provides the neck 26 for connection to a central opening in the floor of the reservoir (see FIG. 2) of the cell; and the radially outer ring 82 likewise provides an upstanding flange 84 for connection to a corresponding flange 86 forming part of the lid 78 and defining the periphery of a central opening in said lid 78. The connection of the reservoir to the neck 26 and of the flange 84 to the flange 86 is in each case a sealed connection formed by welding.

Figure 8:
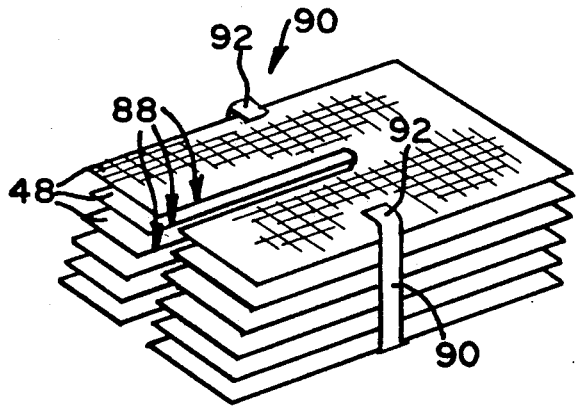
FIG. 8 shows a three-dimensional view of a stack of steel mesh current collectors for use with the structure of FIG. 7.

Turning to FIG. 8, a vertically spaced stack of steel mesh current collectors 48 is shown. Each of them has a slot 88, each slot having an open end or mouth at an edge of the current collector and extending inwardly to a blind end at the centre of the current collector. The slots 88 are in register when seen from above, the current collectors 48 being held in spaced condition in the stack by a pair of straps 90. The straps 90 are tack-welded to the edges of the current collectors 48, at positions on opposite sides of the inner or blind ends of the slots 88. The straps 90 have upper ends 92, bent inwardly over and spaced above the uppermost current collector 48. The upper end 92 of each strap is bent inwardly, for welding to the lid 78 (see FIG. 7). The slots 88 are for receiving the pillar of the anode structure of FIG. 7.

Figure 9:
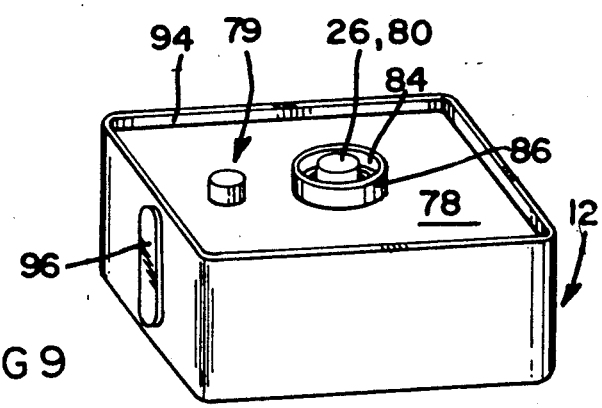
FIG. 9 shows a view corresponding to FIG. 6 of a cell, excluding its reservoir, made from the housing, structure and stack respectively of FIGS. 6, 7 and 8.

In FIG. 9 the same reference numerals are again used for the same parts. In FIG. 9 the lid 78 (see FIG. 8) is shown welded in position by means of an upstanding flange 94 along its periphery, to the upper edges of the walls of the can 12, closing the can 12. The slot 76 is shown closed off by means of a metal closure 96, welded to the can 12.

To assemble the cell in question, the anode structure comprising the stack of envelopes 16 and pillar constituted by the disc 22, collar 24 and spacers 38, is formed, by sealingly connecting them together using glass as described above. The rings 80 and 82 are respectively thermocompression bonded to the collar 24 at 28 and 30, and the lid 78 is welded at the flanges 84, 86 to the ring 82. The current collector stack of FIG. 8 is also prefabricated by cutting or punching the current collectors 48 from mesh with their slots 88, and tack welding them to the straps 90. The pillar of the anode structure of FIG. 7 is then slid in a direction lateral thereto into the slots 88 of the stack of FIG. 8, via their mouths, so that there is a current collector 48 between each adjacent pair of envelopes 16 and vice versa. The bent-over upper ends 92 of the straps 90 are then welded to opposite sides of the underside of the lid 78 adjacent its periphery. The assembly so formed is then inserted downwardly into the can 12, and the lid 78 is welded via its flange 94 to the upper edges of the walls of the can 12, to close the can. Each current collector is typically arranged to have several wires of its mesh projecting outwardly (not shown) from its periphery, for contact with the walls of the can 12. These wires are shown at 50 in FIG. 2.

Typically the cell will be loaded as a cell precursor, of the type comprising a cathode precursor in the form of a particulate mixture of nickel, aluminium, and sodium chloride, impregnated with sodium aluminium chloride molten salt electrolyte, which is an equimolar mixture of chloride and aluminum chloride, as described in more detail in U.S. Pat. No. 4,797,333. Conveniently the solid constituents of this mixture are formed into a particulate mixture, which is charged into the can 12 through the slot 76, substantially to fill the interior of the can apart from the gas space 44 (FIG. 2), in particular to fill the spaces between the envelopes 16 and current collectors 48. The closure 96 is then welded into position to close the slot 76, and molten sodium aluminium chloride electrolyte can be charged into the can through the filler opening 79 in the lid 78, to fill the can 12 except for the gas space 44. The filler opening 79 can then be sealed off.

As indicated above, via the inlet constituted by the ring 80 welded to the top of the pillar of the anode structure, and as described in U.S. Pat. No. 4,797,332, a solution of manganese nitrate can then be used to rinse the interiors of the envelopes 16 and allowed to dry, followed by heating to 200° C. under vacuum to convert the nitrate to the oxide. This is followed by rinsing of the envelope interiors in similar fashion by a 10% Aquadag colloidal graphite solution, which is allowed to dry.

The reservoir 18 (FIG. 2) is then welded to the neck 26, so that the rod 61 is in contact with the steel wool 59, the steel wool having been placed in position in the lowermost envelope 16 before the anode structure of FIG. 7 is constructed.

On application of a charging potential to the terminals 52, 54, the aluminium and nickel react electrochemically with the sodium chloride in the cathode compartment, leading to the production of sodium in the envelopes 16, which sodium fills the envelopes 16 and partially fills the reservoir 18, and leading to the production of nickel chloride in the cathode compartment, together with the consumption of the aluminium, consumption of a portion of the sodium chloride and consumption of a portion of the nickel, by the time the cell is in the fully charged state.

In this regard it will be appreciated that the wool 59 and rod 61, together with the colloidal graphite left as an electronically conductive surface layer on the interiors of the envelopes 16, combine together to provide an electronically conducting pathway between the anode terminal 54 and the solid electrolyte of the envelopes 16, which solid electrolyte is connected to the terminal 52 by the molten salt electrolyte and the current collectors 48, lid 78 and can 12. This permits the above electrochemical reactions to take place when the charging potential is initially applied, to permit sodium to pass through the solid electrolyte of the envelopes 16 into their interiors. The manganese oxide in turn forms a surface layer on the interiors of these envelopes, which provides said interior surfaces with substantially enhanced wettability by the sodium. After initial charging, discharging and subsequent recharging are as described above.

Naturally, other transition metal chlorides of the type mentioned above, in particular $FeCl_2$, can be used analogously to the $NiCl_2$ which has been described as the active cathode material with reference to FIGS. 1–9.

Referring now to FIG. 10, another electrochemical cell in accordance with the present cell is generally designated by reference numeral 10, and unless otherwise specified, the same reference numerals again designate the same parts as in FIGS. 1 and 2.

The pillar for the anode structure of FIG. 10, as in the case of FIG. 2, is provided by a vertically extending $\alpha$-alumina (or $\beta$- or $\beta'$-alumina) composite tube 20. The anode structure is supported at its lower end by a plurality of circumferentially spaced arcuate $\alpha$-alumina (or $\beta$- or $\beta'$-alumina) spacers 98, under the lowermost envelope 16.

The roof or lid of the can 12 has a circular central opening therethrough, the opening having an upstanding flange 100 at its periphery welded to an upstanding flange on an annular ring 102 which has a radially inwardly projecting flange thermocompression bonded to the upper surface of the $\alpha$-alumina collar 24, which is typically metallized to improve this thermocompression bonding and sealing at the bond.

The main difference between FIG. 10 and FIGS. 1 and 2 is that the reservoir 18 is located in the interior of the tubular pillar 20, which is of substantially greater diameter than the pillars 20 of FIGS. 1 and 2.

The roof of the reservoir 18 has a central upwardly projecting neck 104, encircled by the collar 24, which neck 104 is closed by a closure disc 106 having an upstanding peripheral rim welded to the neck 104. The neck 104 is in turn welded to an upstanding flange on an annular ring 108, the ring 108 having a radially outwardly projecting flange thermocompression bonded to the collar 24 at a position spaced radially inwardly from the ring 102, to close off the can 12.

The current collectors 48 have central openings which receive the pillar 20, except for the lowermost current collector 48 which extends under the pillar 20, reservoir 18 and lowermost envelope 16, and has openings therethrough which receive the spacers 98. These arcuate spacers 98 are concentrically aligned with the spacers 38 and are located under the pillar 20, in register with its spacers 38 when seen from above, and are welded by glass to the lower sheet 34 of the lowermost envelope 16.

The reservoir 18 is cup shaped and is inverted, having an open end 110 which faces downwardly. This open end 110 is spaced above the lower sheet 34 of the lowermost envelope 16, which lower sheet 34 has no central opening and is entire. A pad 112 of steel wool is provided centrally on the upper surface of this lower sheet 34 is in contact with the lower end of the post 54, which post passes downwardly through the closure disc 106, to which it is sealingly welded. The upper surface of this lower sheet 34 is electrically conducting, having a layer of electronically conductive graphite thereon.

Turning to FIG. 11, the same reference numerals are used for the same parts as in FIG. 10, unless otherwise specified.

The main difference between FIG. 11 and FIG. 10 is that the reservoir has no neck 104, its entire upper end being enclosed by the closure disc 106; and the collar 24 encircles the upper end of the reservoir 18. Furthermore, while the upper sheet 34 of the uppermost envelope 16 of FIG. 10 has a relatively small central opening to receive the neck 106, that of FIG. has a large opening to receive the reservoir 18.

Figure 12:
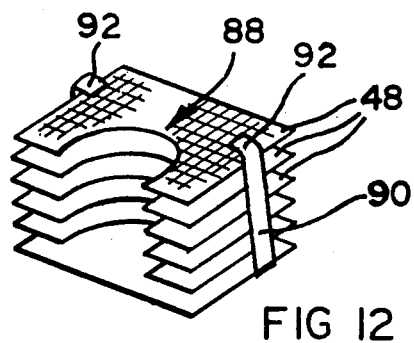
FIG. 12 shows a three-dimensional view of a stack of steel mesh current collectors for use in the cells of FIGS. 10 and 11.

Turning to FIG. 12, the same reference numerals are used as in FIG. 6. In FIG. 12 the slot 88 is in the form of a large semi-circular indentation. The lowermost current collector 48 has no indentation 88 but, instead, has openings therein (not shown) for receiving the spacers 98 (FIGS. 10 and 11). As will emerge hereunder, each of the current collectors 48 shown in FIG. 12 is in fact half of one of the current collectors shown in FIGS. 10 and 11.

Figure 13:
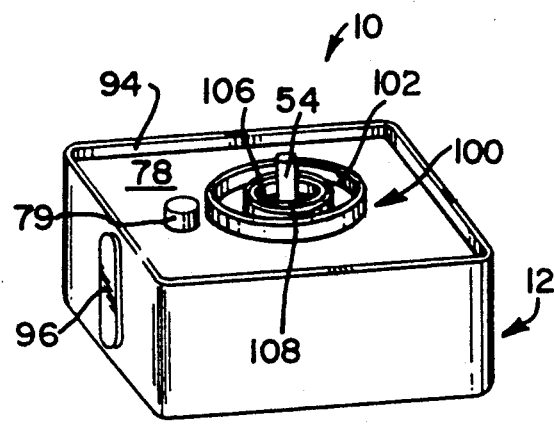
FIG. 13 shows a view similar to FIG. 9 of a cell, made from the housing and stack respectively of FIGS. 6 and 12, with an anode structure as shown in the cell of FIG. 11.

In FIG. 13 the same reference numerals are again used for the same parts as in FIG. 9, except that the post 54, flange 100, ring 102, closure disc 106 and ring 108 are visible, instead of the neck 26, ring 80 and flanges 84, 86 which are visible in FIG. 9.

To assemble the cell of FIG. 10, an anode structure comprising a stack of envelopes 16 and the pillar 20 constituted by the collar 24 and spacers 38, is formed, by sealingly connecting them together, with reservoir 18 in place, using glass as described above. The rings 102 and 108 are respectively thermo-compression bonded to the collar 24, and the upstanding flange of the central opening in the roof or lid 78 is welded to the ring 102. Two current collector stacks of FIG. 12 are prefabricated by cutting or punching the current collectors 48 from mesh with their indentations 88, and tack welding them to the straps 90. The pillar 20 of the anode is then straddled by a pair of the current collector stacks of FIG. 12, so that there is a current collector 48 between each adjacent pair of envelopes 16 and vice versa, the pillar 20 being received in the indentations 88. The lowermost current collectors 48 abut each other under the lowermost envelope 16, and the openings in the lowermost current collector 48 are manipulated over the spacers 98 which are glass welded to the lower sheet 34 of the lowermost envelope 16. The bent-over upper ends 92 of the straps 90 are then welded to opposite sides of the underside of the lid 78 adjacent its periphery. The assembly so formed is then inserted downwardly into the can 12, and the lid 78 is welded via its peripheral flange 94 to the upper edges of the side walls of the can 12, to close the can.

The cell will be loaded in a fashion similar to that described above for FIG. 2, care being taken in FIG. 11 to ensure that the powder mixture fills the space under the lowermost envelope 16.

While the envelopes 16, collar 24 and spacers 98, 38 are glass welded together to form the anode structure, the reservoir 18 will be metal welded to the ring 108.

Via the inlet constituted by this ring 108 the solution of manganese nitrate will be fed into the anode structure to rinse interiors of the envelopes 16 as described above, followed by rinsing of the envelope interiors in similar fashion by the 10% Aquadag colloidal graphite solution.

The disc 106 with its post 54 is then welded to the ring 108, so that the post 54 is in contact with the steel wool 112, the steel wool having been placed in position on the floor of the lowermost envelope 16 beforehand.

In this regard it will be appreciated that the wool 112 and post 54, together with the colloidal graphite left as an electronically conductive surface layer on the interiors of the envelopes 16, combine together as described above for the wool 59 and rod 61 of FIG. 2, to provide an electronically conducting pathway between the anode terminal 54 and the solid electrolyte of the envelopes 16.

Figure 14:
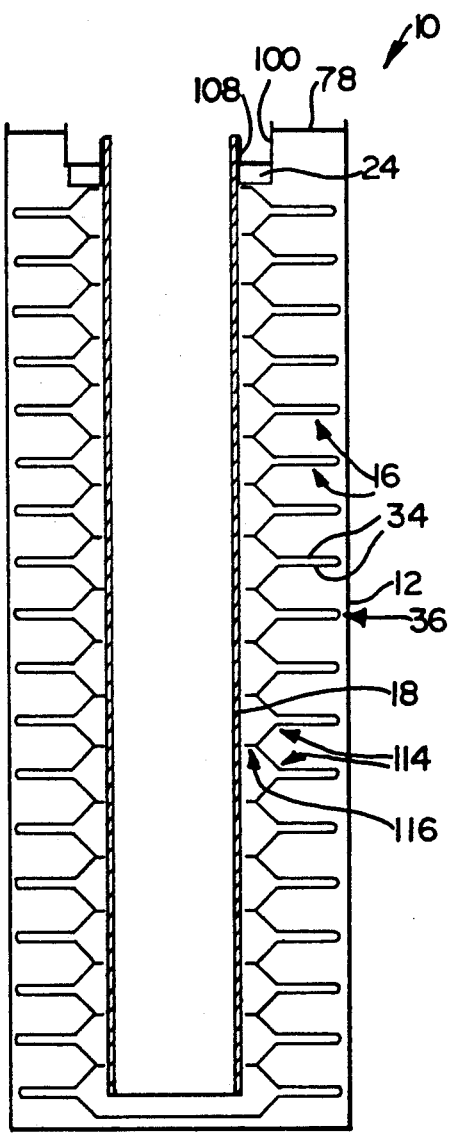
FIG. 14 shows a partial schematic vertical cross-section through a further electrochemical cell according to the invention.
Figure 15:
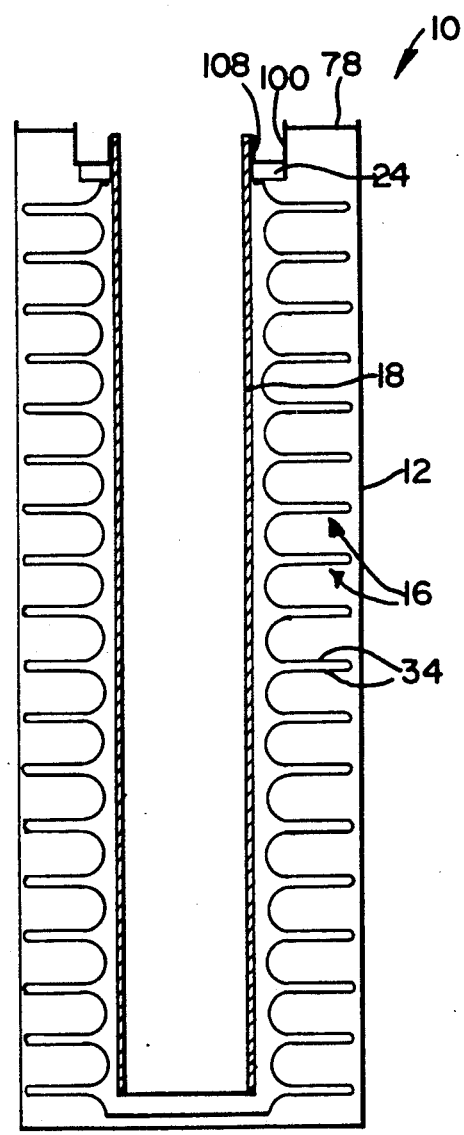
FIG. 15 shows a view similar to FIG. 14 of a still further electrochemical cell according to the invention.

In FIGS. 14 and 15 the same reference numerals are used for the same parts as in FIG. 11, although a number of parts have been omitted from FIGS. 14 and 15 for ease of illustration, those omitted being substantially similar in function and construction to those described above with reference to FIG. 11. In FIGS. 14 and 15 the cells, and their parts such as the anode structure and reservoir 18 are relatively tall and narrow, compared with the equivalent parts in FIG. 11, and are of circular outline in plan view, rather than square.

With reference to FIG. 14, the envelopes 16 are each made of a pair of sheets 34 in the form of annular panels made of green tape material rolled from a mouldable mixture similar to that described above with reference to the sheets 34 of FIGS. 4 and 5. These panels are pressed together at 36 in a fashion similar to the sheets of FIGS. 4 and 5 at their outer peripheries to form an envelope 16. The envelopes are in turn joined together in series by bending opposed panels 34 of adjacent envelopes 16 towards each other at 114 so that they meet at 116, where they are joined together in a similar fashion to the joins at 36. In this way a stack of envelopes 16 is provided which, after sintering, forms the anode structure with its central conduit which receives the reservoir 18, there being no separate central tube or pillar.

In FIG. 15 the anode structure shown is in the form of a unitary casting, made by slip-casting in a suitable mould, or by dip-casting a paper shape, from a $\beta$-alumina particle slurry, the green casting then being sintered.

Naturally, the constructions of FIGS. 14 and 15 can be modified to have narrower central conduits, the reservoirs being removed from these conduits and located above the conduits, in the fashion of FIGS. 1 and 2.

Figure 16:
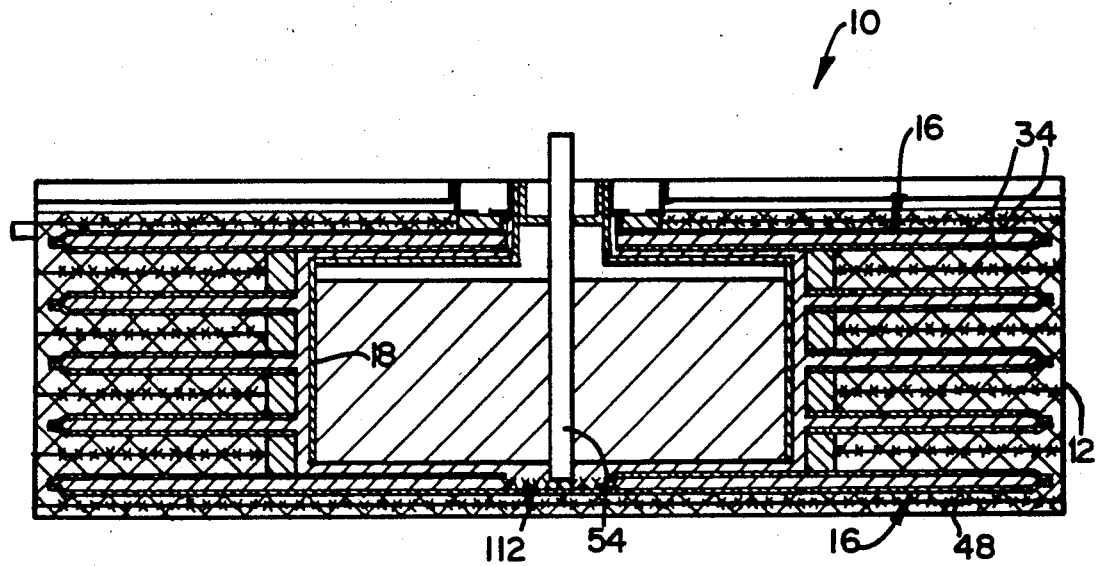
FIGS. 16 and 17 show respectively modified forms of the cells of FIGS. 10 and 11.
Figure 17:
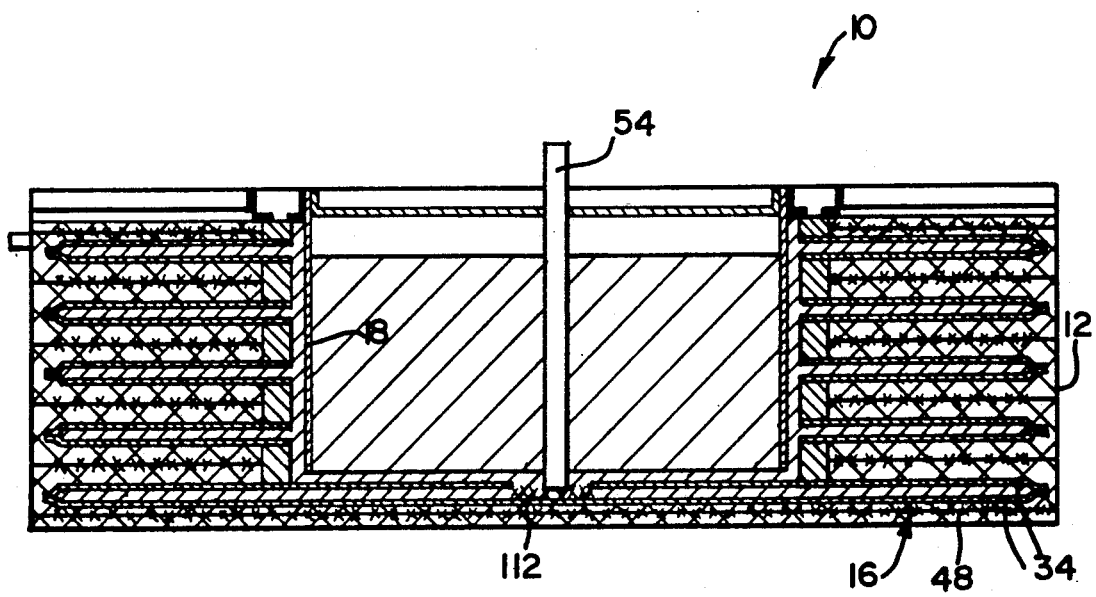

It should be noted that, while the envelopes 16, sheets 34 and cans 12 of FIGS. 1, 2, 10 and 11 are square in plan view, those of FIGS. 14 and 15 are in fact circular, so that the cells of FIGS. 16 and 17 are circular-cylindrical in shape.

Finally FIGS. 16 and 17 show modified versions respectively of the cells of FIGS. 10 and 11, only the modifications being described, as the remaining parts of these cells are substantially identical to the cells of FIGS. 10 and 11 respectively.

In the cells of FIGS. 16 and 17 the spacers 98 of FIGS. 10 and 11 and the openings therefor in the lowermost conduit collector 48 are omitted, the lowermost envelope 16 being spaced from the floor of the can 12 by the lowermost current collector 48. Furthermore, in each case the upper sheet 34 of each lowermost envelope 16 extends under the reservoir 18 and has a small central opening, smaller than the reservoir 18, for receiving the lower end of the post 54 and the steel wool 112.

In FIG. 16, furthermore, the lower sheet 34 of the uppermost envelope 16 extends, together with the upper sheet thereof, over the top of the reservoir 18, the sheets 34 of the uppermost envelope having central openings of the same size, narrower than the reservoir 18, and only sufficiently wide to receive the neck 104.

It is a particular advantage of the invention that the geometry provided by the cells of FIGS. 1, 2, 10, 11, 16 and 17 can lead to simple straightforward construction using well established methods, while providing for considerable freedom of choice in design, as regards cell capacity, employing standardized components. It will be appreciated in this regard that to change the capacity of such cells, all that it required is to use a can 12 of different height, while varying the number of envelopes 16 in the can, and, if necessary, while varying the capacity of the reservoir 18. This accordingly permits, for cells of different capacities, standardized envelopes 16 to be mass produced, together, when required, with standardized spacers 38, collars 24 and the like. The only other changes which need be made are to the depth of the can 12.

A further particularly advantageous aspect of the cell of the present invention, is that the envelopes 16 can be made of robust construction, relatively resistant to internal and external pressures normal to their major faces, by virtue of the contact between the crests of the corrugations 68 of the one sheet 34 with those of the other sheet 34 (FIGS. 4 and 5). In this construction, extremely small volumes can be provided for the interior of each envelope 16, which interior remains reliably filled with sodium and fully wetted thereby during all states of charge.

In particular, the construction of the cell makes possible the use of a number of extremely thin envelopes 16, the volume of which is unrelated to anode capacity, which anode capacity is controlled by the reservoir size. Between the envelopes can be located a number of thin cathode portions, thereby making the cell suitable for high power applications with high rates of charge and discharge, such cells naturally usually being cathode limited. Design flexibility also permits, when high power is not the primary concern, a greater spacing between the envelopes to increase cathode capacity, the beneficial aspect of large electrolyte areas and relatively thin volumes of cathode between the envelopes nevertheless being retained.

As variations of the constructions shown in the drawings, it should be noted that the disc 22 can be omitted from FIGS. 1 and 2 (and indeed from the constructions of FIGS. 1A, 2A and 3A–3C) and so can the spacers 98 of FIGS. 10 and 11, in favour of the construction of FIGS. 16 and 17, wherein the lowermost current collector 48 supports the anode structure via the lower sheet 34 of the lowermost envelope 16.

Similarly, although corrugations 68 are described with reference to FIGS. 4 and 5 to provide a continuous space between the sheets 34 of each envelope, these sheets 34 can be spaced from each other by spacers in the form of squat pillars or strips of $\beta''$-alumina. Indeed any suitable recessed or raised pattern or texture can be provided on the inner faces of the sheets 34, by silk screening, imprinting or the like, to provide the space between said sheets.

We claim:

1. A high temperature electrochemical power-storage cell comprising a cell housing defining a cathode compartment containing a cathode and containing an anode structure located within the cathode compartment and comprising a plurality of holders filled with active anode material which is molten at the operating temperature of the cell, the anode structure defining a conduit containing active anode material and the holders being flattened in shape and spaced along the conduit in series from one another, the interior or each holder being in communication with the conduit and each holder having a pair of oppositely outwardly facing major faces extending transversely to the conduit and comprising a material which is an ionic conductor of the active anode material, the cathode occupying the spaces between the holders and the cell including a reservoir for active anode material in communication with the conduit, the reservoir in all states of charge of the cell being at least partially filled with active anode material, the housing having a base forming its lower end on which it rests with the cell in an upright operative condition, the anode structure and conduit extending upwardly along the interior of the housing, the holders being vertically flattened and vertically spaced in series from one another, and the major faces of the holders being upper and lower faces respectively.

2. A cell as claimed in claim 1, in which the reservoir is located above the conduit, being in communication with the upper end of the conduit.

3. A cell as claimed in claim 2, in which the reservoir has a floor which slopes downwardly towards a drain which leads into the upper end of the conduit.

4. A cell as claimed in claim 1, in which the reservoir is located in the interior of the conduit, being enclosed thereby.

5. A cell as claimed in claim 4, in which the reservoir extends along substantially the full length of the interior of the conduit, a peripheral space being defined around the reservoir in the conduit and the holders being in communication with this space.

6. A cell as claimed in claim 5, in which the communication between the reservoir and the conduit is via the lower end of the reservoir and leads into the lower end of the conduit, the peripheral space around the reservoir in the conduit being a capillary space.

7. A cell as claimed in claim 1, in which the communication between the reservoir and the conduit is via the lower end of the reservoir, the reservoir containing, above the molten anode material therein, an inert gas under pressure.

8. A cell as claimed in claim 1, in which the reservoir, holders and conduit have an internal lining of wicking material for wicking molten anode material.

9. A cell as claimed in claim 1, in which the conduit is provided by the interior of a hollow tube on which the holders are mounted in spaced relationship in series, the tube communicating with the interiors of the holders via central openings in the major faces of the holders.

10. A cell as claimed in claim 9, in which the tube is made up of a plurality of annular segments arranged end-to-end, so that the tube is of composite construction, the segments spacing the holders apart and being sealed thereto.

11. A cell as claimed in any claim 1, in which the anode material is sodium and the major faces of the holders are solid electrolyte conductors of sodium ions.

12. A cell as claimed in claim 11, in which the cathode comprises an electronically conductive electrolyte-permeable porous matrix which is impregnated with a molten salt electrolyte comprising sodium cations and halide anions, an electrochemically active metal halide cathode substance being dispersed in the porous interior of the matrix and the active cathode substance being substantially insoluble in the molten salt electrolyte.

13. A high temperature electrochemical power storage cell comprising a cell housing defining a cathode compartment containing a cathode and containing an anode structure located within the cathode compartment and comprising a plurality of holders filled with active anode material which is molten at the operating temperature of the cell, the anode structure defining a conduit containing active anode material and the holders being flattened in shape and spaced along the conduit in series from one another, the interior of each holder being in communication with the conduit and each holder having a pair of oppositely outwardly facing major faces extending transversely to the conduit and comprising a material which is an ionic conductor of the active anode material, the cathode occupying the spaces between the holders and the cell including a reservoir for active anode material in communication with the conduit, the reservoir in all states of charge of the cell being at least partially filled with active anode material, each holder being formed from a pair of spaced panels respectively providing the major faces of the older, the panels of each said pair being sealed together along their outer peripheries, and each adjacent pair of holders being connected together face to face in communication with each other at openings in opposed major faces thereof, along the peripheries of which openings said major faces are sealed to each other.

14. A cell as claimed in claim 13, in which the housing has a base forming its lower end on which it rests with the cell in an upright operative condition, the anode structure and conduit extending upwardly along the interior of the housing, the holders being vertically flattened and vertically spaced in series from one another, the major faces of the holders being upper and lower faces respectively.

15. A cell as claimed in claim 14, in which the reservoir is located above the conduit, being in communication with the upper end of the conduit.

16. A cell as claimed in claim 15, in which the reservoir has a floor which slopes downwardly towards a drain which leads into the upper end of the conduit.

17. A cell as claimed in claim 14, in which the communication between the reservoir and the conduit is via the lower end of the reservoir, the reservoir containing, above the molten anode material therein, an inert gas under pressure.

18. A cell as claimed in claim 13, in which the reservoir is located in the interior of the conduit, being enclosed thereby.

19. A cell as claimed in claim 18, in which the reservoir extends along substantially the full length of the interior of the conduit, a peripheral space being defined around the reservoir in the conduit and the holders being in communication with this space.

20. A cell as claimed in claim 19, in which the housing has a base forming its lower end on which it rests with the cell in an upright operative condition, the anode structure and conduit extending upwardly along the interior of the housing, the holders being vertically flattened and vertically spaced in series from one another, the major faces of the holders being upper and lower faces respectively, the communication between the reservoir and the conduit being via the lower end of the reservoir and leading into the lower end of the conduit, and the peripheral space around the reservoir in the conduit being a capillary space.

21. A cell as claimed in claim 13, in which the reservoir, holders and conduit have an interior lining of wicking material for wicking molten anode material.

22. A cell as claimed in claim 13, in which the anode material is sodium and the major faces of the holders are solid electrolyte conductors of sodium ions.

23. A cell as claimed in claim 22, in which the cathode comprises an electronically conductive electrolyte-permeable porous matrix which is impregnated with a molten salt electrolyte comprising sodium cations and halide anions, an electrochemically active metal halide cathode substance being dispersed in the porous interior of the matrix and the active cathode substance being substantially insoluble in the molten salt electrolyte.

24. A high temperature electrochemical power storage cell comprising a cell housing defining a cathode compartment containing a cathode and containing an anode structure located within the cathode compartment and comprising a plurality of holders filled with active anode material which is molten at the operating temperature of the cell, the anode structure defining a conduit containing active anode material and the holders being flattened in shape and spaced along the conduit in series from one another, the interior of each holder being in communication with the conduit and each holder having a pair of oppositely outwardly facing major faces extending transversely to the conduit and comprising a material which is an ionic conductor of the active anode material, the cathode occupying the spaces between the holders and the cell including a reservoir for active anode material in communication with the conduit, the reservoir in all states of charge of the cell being at least partially filled with active anode material, the anode structure being of unitary construction, being a casting, each adjacent pair of holders communicating with each other via openings in the major faces thereof and being connected together along the peripheries of said openings.

25. A cell as claimed in claim 24, in which the housing has a base forming its lower end on which it rests with the cell in an upright operative conduction, the anode structure and conduit extending upwardly along the interior of the housing, the holders being vertically flattened and vertically spaced in series from one another, the major faces of the holders being upper and lower faces respectively.

26. A cell as claimed in claim 25, in which the reservoir is located above the conduit, being in communication with the upper end of the conduit.

27. A cell as claimed in claim 26, in which the reservoir has a floor which slopes downwardly towards a drain which leads into the upper end of the conduit.

28. A cell as claimed in claim 25, in which the communication between the reservoir and the conduit is via the lower end of the reservoir, the reservoir containing, above the molten anode material therein, an inert gas under pressure.

29. A cell as claimed in claim 24, in which the reservoir is located in the interior of the conduit, being enclosed thereby.

30. A cell as claimed in claim 29, in which the reservoir extends along substantially the full length of the interior of the conduit, a peripheral space being defined around the reservoir in the conduit and the holders being in communication with this space.

31. A cell as claimed in claim 30, in which the housing has a base forming its lower end on which it rests with the cell in an upright operative condition, the anode structure and conduit extending upwardly along the interior of the housing, the holders being vertically flattened and vertically spaced in series from one another, the major faces of the holders being upper and lower faces respectively, the communication between the reservoir and the conduit being via the lower end of the reservoir and leading into the lower end of the conduit, and the peripheral space around the reservoir in the conduit being a capillary space.

32. A cell as claimed in claim 24, in which the reservoir, holders and conduit have an internal lining of wicking material for wicking molten anode material.

33. A cell as claimed in claim 24, in which the anode material is sodium and the major faces of the holders are solid electrolyte conductors of sodium ions.

34. A cell as claimed in claim 33, in which the cathode comprises an electronically conductive electrolyte-permeable porous matrix which is impregnated with a molten salt electrolyte comprising sodium cations and halide anions, an electrochemically active metal halide cathode substance being dispersed in the porous interior of the matrix and the active cathode substance being substantially insoluble in the molten salt electrolyte.

* * * * *

UNITED STATES PATENT AND TRADEMARK OFFICE
CERTIFICATE OF CORRECTION

PATENT NO. : 5,187,029

DATED : February 16, 1993

INVENTOR(S) : Johan Coetzer and James Hugh Duncan

It is certified that error appears in the above-identified patent and that said Letters Patent is hereby corrected as shown below:

Column 21, line 18 (claim 13), delete the word "older" and insert --holder--.

Column 21, line 64 (claim 21), delete the word "interior" and insert --internal--.

Column 22, line 35 (claim 25), delete the word "conductive" and insert --condition--.

Signed and Sealed this

Sixteenth Day of November, 1993

Attest:

BRUCE LEHMAN

Attesting Officer — Commissioner of Patents and Trademarks